Oct. 14, 1969  N. A. HEGLAND ET AL  3,472,206
APPARATUS AND METHOD FOR FARROWING SOWS AND
REARING AND BROODING PIGLETS
Filed June 14, 1967
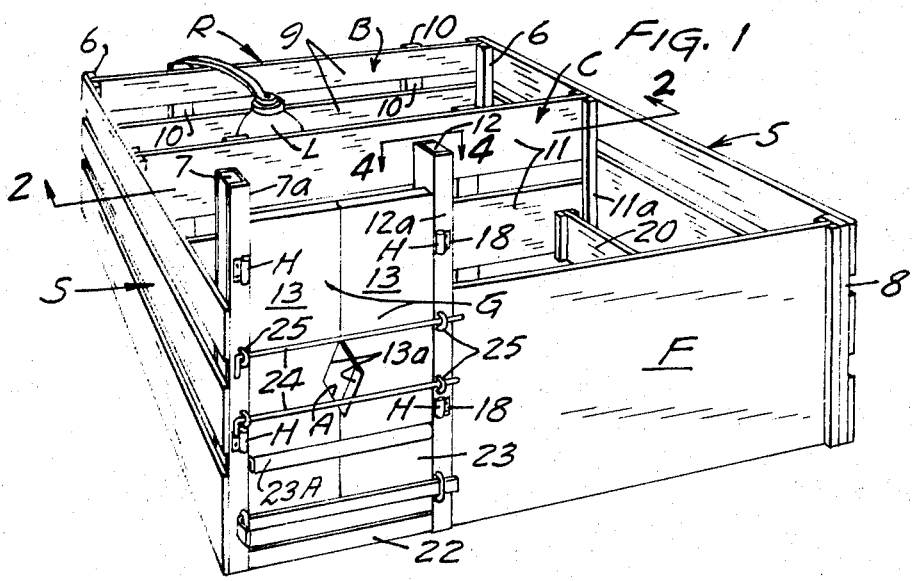
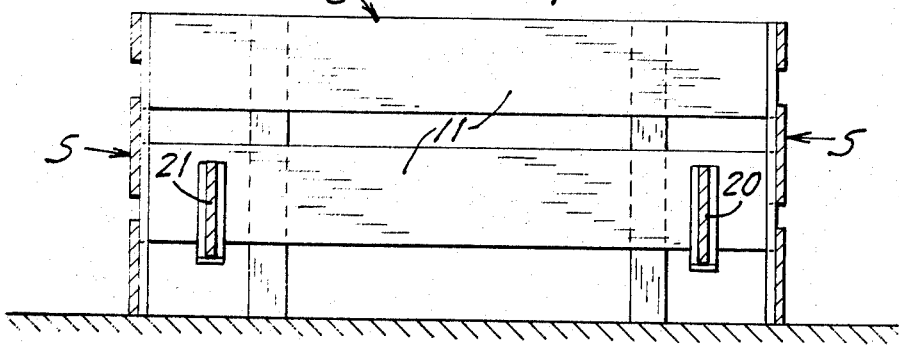
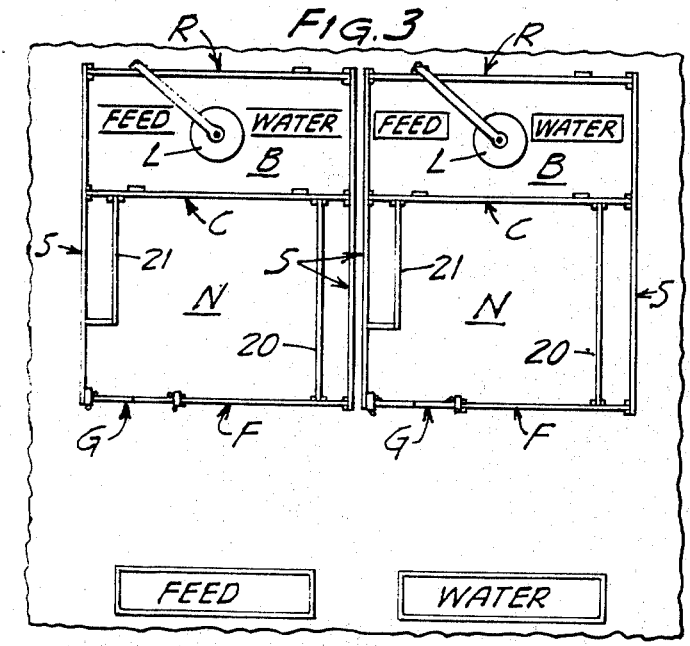
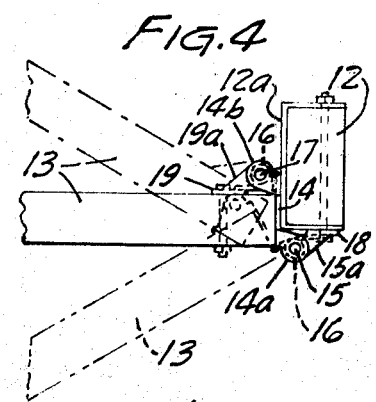
INVENTORS
NORVAL A. HEGLAND
GEORGE H. WENDLAND
BY
Williamson, Palmatier Bains
ATTORNEYS United States Patent Office 3,472,206
Patented Oct. 14, 1969

3,472,206
APPARATUS AND METHOD FOR FARROWING SOWS AND REARING AND BROODING PIGLETS
Norval A. Hegland, Appleton, and George H. Wendland, Bellingham, Minn., assignors of one-third to Hjalmer Hegland, Appleton, Minn.
Filed June 14, 1967, Ser. No. 646,087
Int. Cl. A01k 1/02
U.S. Cl. 119—20                                    8 Claims

ABSTRACT OF THE DISCLOSURE

A system including apparatus and method for hygienically and economically farrowing a sow and nursing and rearing piglets. The system is characterized by the step of acquaintaining the mother animal with special quarters for farrowing and nursing, prior to parturition, of the piglets. Thereafter, the sow is confined in quarters only a short time for the birth of the piglets. Thereafter, the sow is confined in quarters for nursing and rearing of the piglets, which are identical to the farrowing chamber and for a brooding chamber for piglets which is available to the piglets only from the nursing chamber with a critical factor or step of providing access or exit of the sow only, to and from the nursing chamber, at will.

---

The apparatus comprises a sow and piglet-confining medium having a nursing chamber to nicely accommodate a sow, and having an adjacent brooder chamber for the piglets together with an interconnecting passage between said chambers of a restricted height to permit travel of the small piglets only therethrough, and in further combination with an exit passageway from the nursing chamber which may be used by the sow at will, to exit and reenter, but which is constructed to prevent use thereof by the smaller piglets. The last mentioned exit passageway is preferably provided with a door, swingable both inwardly and outwardly, and yieldably maintained normally in closed position, and which door has a viewing aperture at proper height for use by the mother animal to facilitate the sow's operation of the door, both for exit and for entrance by viewing the premises on either side of the door.

This invention relates to the farrowing of mother sows and to provision for safely, healthfully and efficiently nursing and caring for the infant pigs up to and past the weaning stage.

At the present time there are available in the United States market, a number of farrowing crates, pens and complicated devices wherein the sow may be farrowed and the piglets nursed and cared for. Some of the prior art makes provision for safety to the piglets during nursing operations to prevent inadvertent crushing of piglets when the sow lies down in the crate or pen.

However, in all such prior art no provision is made for willfully permitting the mother sow to leave and have access to the nursing pen when her instinct requires it.

Such prior art devices and methods where a door is provided for exit of a mother sow, also permits the piglets to leave the farrowing and nursing pen at the same time.

The disadvantages and objections to such prior art devices are manifold, to wit:

(1) Although the instinct and the will of the sow in the nursing pen is to leave for the purpose of evacuating waste materials, no provision is made to enable her to leave her farrowing pen and return thereto of her own free will.

(2) As a result of the conditions of preceding objection number 1, the sow fouls the pen, causing a messy and unhealthy environment for the piglets.

(3) The sow is often discontent, having the desire to leave the cage or pen, and this condition impedes the production of abundant milk.

(4) The sow obtains only minimal exercise, which is undesirable for maximum production of milk for the infant pigs.

(5) In most prior art farrowing and rearing facilities and methods, the labor of an operator is required to allow the sow to exit and then later, to readmit her.

It is an object of our invention to overcome the objections to prior art apparatus and method enumerated, and to provide a very efficient, sanitary and economical method and apparatus for farrowing the sow, and for nursing and bringing up the piglets through at least the stage of weaning from the mother.

More specifically it is an object to provide a method of farrowing sows and brooding, nursing and rearing piglets wherein the sow may leave and reenter the farrowing and nursing chamber at will for the purposes of manuring and exercise, and wherein the piglets are always confined within the pen and are preferably provided with brooding facilities, including supply of water, feed and warmth.

Another and more specific object is the provision of a sanitary and inexpensive method and simple apparatus for carrying out said method wherein the mother sow through its substantial strength and weight, may open a normally closely gate to the chambers of a pen for exit or reentry, and wherein however, restriction means are provided to prevent the relatively small piglets from operating the gate or from leaving their confinement during the nursing and weaning period.

These and other objects and advantages of our invention will more readily appear from the following description made in connection with the accompanying drawings wherein like reference characters refer to similar parts throughout the several views, and in which:

FIG. 1 is a top perspective view showing an embodiment of our improved apparatus for accommodating one mother sow and its brood of piglets;

FIG. 2 is a vertical cross section of the pen apparatus taken substantially along the line 2—2 of FIG. 1 looking in the direction of the arrows;

FIG. 3 is a somewhat diagrammatical plan view of two of our improved pens disposed in side by side relation in a portion of a barn which has been converted to swine raising, and defining an exercising, feeding and watering space for a pair of mother sows, outside of the farrowing, nursing, and rearing pens; and FIG. 4 is a detail cross section through the line 4—4 of FIG. 1 showing in detail a satisfactory tensioned, double hinged gate which is proven efficient for sow's exit and entry purposes.

Referring now in detail to the structure provided by the specimen of our apparatus and method illustrated a generally rectangularly transversely divided pen indicated as an entirety by the numeral P is employed, preferably of knocked down or collapsible structure having, as shown, a front wall F which is preferably solid and unslotted, a rear wall R and a pair of side walls S, said rear and side walls preferably constructed from a plurality of edgewise disposed boards secured to rear corner posts 6 and forward corner posts 7 and 8, it being important that the lowermost boards of said rear and side walls be spaced from the ground or floor upon which the pen is supported not more than two or three inches, to prevent escape of the newly born piglets. The rear wall comprising spaced boards 9 may be reinforced with vertical slats 10.

A central partition or wall C divides the interior of the pen into a relatively large farrowing and nursing chamber N and a relatively narrow brooder chamber B for the piglets. The central partition C may comprise two or more transversely disposed boards 11 secured at their ends as shown, to upright posts and the lowermost of which boards 11 is disposed at its lower edge about eight inches above the barn floor, ground or other support for the pen, a distance which will enable the piglets, from birth to an age of eight or nine weeks, to move thereunder into the brooder chamber B.

The brooder chamber B is preferably provided with an overhanging heat lamp L and with watering and feeding facilities, as indicated in FIG. 3.

Normally closed spring tensioned egress and inlet means for the mother sow are provided at one side of the front wall F of the pen, in the embodiment illustrated comprising a pair of double hinged gates G hingedly mounted upon the forward corner post 7, and a similar post 12, to one side of which front wall F is secured. The two posts 7 and 12 may be constructed of any suitable rigid material and as shown comprise upright channel irons 7a and 12a which are filled with wooden posts W. The cooperating gates G may be constructed from two rigid boards or plates 13 disposed vertically and substantially filling the space between posts 7 and 12 when the gates are in normal closed and tensioned position. Any suitable hinge structures may be utilized for swingably connecting the outer edges of the gate boards 13 to permit swinging of the gates inwardly or outwardly of the pen provided means are included to urge the gates into substantially vertically aligned closed position. The spring means or equivalent (such as weights) for tensioning the gate boards must be adequate in force so that even at the age of eight or nine weeks the piglets cannot overcome such force to open the gate.

In FIG. 4 we have illustrated an efficient spring-actuated double hinge structure (indicated as an entirety by the letter H) available on the present market which has proven efficient for our purposes. As shown, four of said double hinge devices are employed, two for each of said gate boards 13. As shown, each hinge comprises an intermediate swingable vertical hinge plate 14, normally positioned as shown in full lines in FIG. 4 and rigidly carrying at its upper and lower ends perpendicular flange lugs 14a which are pivotally connected by hinge bolt 15 with upper and lower brackets 15a affixed to an attachment plate 18 which is secured vertically to the outer face of the appropriate post of the doorway. The intermediate plate 14 of each hinge, at its inward edge opposite from flange lugs 14a, rigidly carried upper and lower flange lugs 14b which are pivotally connected by vertical pin 17 with attachment plate 19 carrying the upper and lower pivot lugs 19a. Attachment plate 19, in the form of hinge shown, is rigidly affixed to the inner surface of the appropriate swinging door 13 adjacent the jamb edge thereof. A conventional vertical coil torsion spring (not shown) surrounds the pivot pin 17 with one end thereof affixed as by abutment with the adjacent end of the intermediate swingable hinge plate 14, said spring urging the door from the dotted line, inwardly swung position of FIG. 3 to the full line position. A similar but oppositely operating torsion spring (not shown) is coiled about the pivot pin 15 with one of its ends affixed to the attachment plate 18 and its opposite end affixed to the outward edge of the intermediate, swingable hinge plate 14, serving to urge the intermediate plate 14 from the lower dotted line position of FIG. 3 to the full line position. The tension of the two torsion springs is exerted oppositely upon the door and is balanced so that the door plates 13 are normally disposed in substantially registering, vertically aligned position, as shown in FIG. 1.

To protect the piglets from being crushed when the mother sow reclines in the nursing chamber N, horizontal rails 20 and 21 are secured in spaced relation to right and left side walls S of the pen through the width of the nursing chamber, preferably spaced approximately eight inches above the floor or ground upon which the pen is mounted, for accommodation of the piglets.

To quickly educate the mother sow to make use of the swingable door means, a viewing aperture or window A is provided in the hinged door sections 13, as by making elongated, obtuse angled notches 13a in the corresponding portions of the door edges at a height which would encompass the snout and eyes of an average sized sow.

We provide barrier means, preferably adjustable in height, for preventing exit of the little pigs from the nursing chamber N at the time the mother sow forcibly opens the hinged door means for exit. For this, a bottom sill board 22 is provided, which may be removable or stationary and above this, supported thereon, one or more adjustable barrier sections (shown as 23) are provided. The barrier section 23 fits the lower portion of the doorway in vertically slidable manner, having means (not shown) such as projecting flanges which fit in keeper tracks (not shown) secured to the inner sides of the doorway.

A transverse cushioning means such as a rubber hose section or other compressible element, is affixed to the upper edge of the barrier section 23 and has for its purpose to prevent injury to the mother sow's udder during exit of the sow from the nursing chamber.

It is essential to our method and invention that suitable means be provided for at times locking the gate means G. To this end, as shown, a plurality of lock rods 24 are employed to prevent forward opening of the gates G, removably secured in loop holders 25 horizontally aligned in pairs for reception of the rods and secured to the outer faces of the door posts 7 and 12. Gate structure G is maintained in locked position with the mother sow confined in the farrowing and nursing chamber N, shortly prior to delivery of the piglets and through delivery.

METHOD AND PROCEDURE

In utilizing our apparatus, as described herein, to obtain the numerous hygienic, economic and other benefits therefrom, the following method and procedure are used:

Several days or a week prior to the expected delivery or parturition, the mother sow is induced into the farrowing and nursing chamber N by offering her a small quantity of feed disposed in the container and moving that feed by opening of gates G into the nursing chamber N. Thereafter, the sow quickly learns to exit through gates G since the viewing aperture A at substantially eye level shows here the area surrounding the pen, which is usually provided (as shown in FIG. 3) with a watering trough and suitable feeder. This step or procedure may be repeated once or twice.

The sow is locked in the nursing and farrowing pen during final gestation and prior to parturition, for a period of a day after delivery, after which she has become familiar with the opening of gates G by force applied thereto by her snout, and her natural instincts cause her to leave the pen for exercise, for evacuation outside of the pen, and for then feeding and watering from the sow troughs disposed exteriorly of the pen as shown in FIG. 3. Extensive experimental use of our improved apparatus or structure, and our method of farrowing sows and rearing piglets has shown that the mother animal readily becomes accustomed to entering and exit from the nursing chamber at will, and in accordance with her natural instincts, to manure and exercise outside of the pen. The small piglets cannot exit from the nursing chamber because of the barrier constituting cross pieces 22 and 23. The compressible or soft protection edge 23a on the upper edge of the rigid barrier rail 23 protects the udder of the mother sow from injury during entry and exit from the pen.

The front wall F of the pen is preferably solid and non-foraminous to facilitate the natural instincts of the sow in looking through some viewing aperture in the gate structure. Secondly, the natural instinct of a sow, in lying down, is to turn with her back towards a solid wall. Thus, for nursing purposes the sow enters the nursing pen N, lies down with her udder exposed and adjacent to the piglet entrance below the lowermost of the partition boards 11.

In prior art structures where the sow is confined in the farrowing pen, until an operator releases her, she often becomes disturbed because of the need for exercise or evacuation, which she instinctively represses within the nursing chamber. Such disturbed condition of the sow results in substantially poor production of milk, with the result that the mother sow is distressed and discontented. We have compared our method of farrowing the sow and rearing the piglets with the methods of the prior art where the sow is confined until release by an operator, and have abundant proof to show that the growth and increased weight of the piglets is substantially improved when our method is utilized. In this connection, after farrowing of the sow, the nursing pen is substantially free from waste and manure and the piglets are raised past the weaning stage under excellent hygienic conditions. The piglets have abundant room for exercise in the overall area of the pen and of course, a large part of the time when the weather is cool or inclement, even as in a barn, repose in the brooder chamber B where heat, water and weaning compounds and feed are supplied.

From the foregoing description it will be seen that we have devised and provided a new and improved method for farrowing sows and rearing and brooding piglets, resulting in an improved delivery and rearing of piglets under excellent hygienic and sanitary conditions, and with marked economies available to the users.

The production of milk from the mother animal, because of the improved conditions and the ability of the sow to exit from and reenter the nursing and farrowing chamber at will is accountable for a "contented" sow with consequent greater production of milk because of exercise and free from disturbance during the nursing end first part of the weaning period.

Further, we have devised and provided new and improved apparatus for carrying out such a method successfully and with marked economy in space requirements, cost and labor to the users.

It will be further understood that multiple use of our apparatus and pen for a number of sows and their piglets is intended, and constitutes a form of the invention where as disclosed in FIGURE 3, separate sets of pens are set up within the confines of a barn or on the ground, with a central exercise and feeding place for the respective sows of the several broods. In such instance, usually a common bunker feeder or other feeder means is provided centrally for all the mother sows as well as watering facilities. Experience has shown that the sows enter and exit only from their respective farrowing, nursing and brooder pen.

It will of course be understood that various changes may be made in the form, details, arrangement and proportions of the various parts without departing from the scope of our invention.

What is claimed is:

1. An apparatus-system for hygienically and economically nursing and rearing piglets, having in combination,
    an upstanding sow and piglet-confining medium having a nursing chamber of dimensions to nicely accommodate a sow and having an adjacent brooder chamber for piglets,
    an interconnecting passage between said brooder chamber and said nursing chamber of a restricted height to permit travel of small piglets therethrough but to exclude travel of the mother sow,
    a passage between said nursing chamber and the exterior, and barrier means at the lower portion of said passage for preventing piglets from leaving said confining medium while permitting sow-travel thereover, and defining a relatively high passage in said nursing chamber communicating with the exterior of said confining medium for permitting travel therethrough of the sow at will.

2. The structure set forth in preceding claim 1 wherein said nursing chamber serves also as a farrowing chamber, and
    wherein releasable means are provided for blockading said sow-passage to confine said sow in said nursing chamber during farrowing of the sow.

3. The structure set forth in preceding claim 1 further characterized by,
    a yieldable, normally closed door in said sow-travel passage, of a structure to be opened in either direction by the sow,
    and low barrier means for preventing travel of piglets through said sow-travel passage at all times.

4. The structure set forth in preceding claim 3 further characterized,
    by the sow-travel passage in said nursing chamber, having a removable piglet barrier at the lower end thereof a height to prevent piglets from leaving said confining medium while readily permitting the sow to travel therethrough.

5. The structure set forth in preceding claim 4, further characterized by,
    said barrier means having a cushioned upper edge to prevent injury to the udder of the sow in travel thereover.

6. A method for hygienically and economically rearing and nursing piglets, which consists in,
    providing enclosed brooder quarters for piglets and adjacent sow-confining and nursing quarters with travel-communication between said two quarters available only to the small piglets and preventing access to said brooding quarters by the mother sow,
    providing in said sow-confining quarters an exterior, normally closed passage openable at will by action of the mother sow but having means therein preventing travel therethrough by said piglets when opened by said sow,
    and inducing the mother sow to enter and exit said sow-confining quarters prior to delivery of piglets,
    and causing disposal of said piglets upon birth thereof in said quarters.

7. The method steps set forth in preceding claim 6 further characterized by
    confining said sow in said nursing quarters during farrowing and for a short duration thereafter by locking said sow-travel passage,
    and then opening said passage for travel of said sow at will therethrough.

8. The structure set forth in preceding claim 1 further characterized by,
    yieldable, normally closed door means in said sow-travel passage constructed and tensioned to be opened in either direction by the sow,
    low barrier means for preventing travel of the piglets through said sow-travel passage,
    and said door means for the most part being imperforate to obstruct vision but having a viewing window formed intermediate of the height thereof disposed approximately at the height of the snout and eyes of a sow.

References Cited

UNITED STATES PATENTS

| | | | |
|---|---|---|---|
| 2,512,954 | 6/1950 | Marks | 119—155 |
| 3,016,878 | 1/1962 | Kallal | 119—155 |
| 3,125,988 | 3/1964 | King | 119—20 |
| 3,203,033 | 8/1965 | Banse | 119—20 X |
| 3,209,728 | 10/1965 | Beckers | 119—20 |
| 3,216,396 | 11/1965 | Scamman | 119—20 |

ALDRICH F. MEDBERY, Primary Examiner

U.S. Cl. X.R.

119—155